United States Patent Office 3,280,069
Patented Oct. 18, 1966

3,280,069
POLYPROPYLENE CONTAINING ETHYL 3,5-DI-TERT - BUTYL - 4 - HYDROXY-α-CYANOCINNA-MATE
Gordon G. Knapp, Southfield, and Calvin J. Worrel, Detroit, Mich., assignors to Ethyl Corporation, New York, N.Y., a corporation of Virginia
No Drawing. Filed Mar. 31, 1965, Ser. No. 444,414
1 Claim. (Cl. 260—45.85)

This application is a continuation-in-part of co-pending application Serial No. 77,277, filed December 21, 1960, now abandoned.

This invention relates to the stabilization of plastic against the oxidative and deteriorative effects of ultra-violet light.

The deterioration of plastics on light exposure is attributable to radiation below 400 millimicrons wavelength. The lower the wavelength of the incident light, the higher the energy content per photon, and the more damaging its effect potentially. To produce chemical change in a material, this energy must first be absorbed. Plastics differ appreciably in their ultra-violet absorbing properties, but none are completely transparent in the 300 to 400 millimicron range. All absorb significantly at 300 millimicrons and lower. Once radiant energy is absorbed, the likelihood of chemical change will depend on the stability of chemical bondings and the polymer. The deteriorative effect of light is usually enhanced by the presence of oxygen, moisture, and heat. In many cases, the deterioration is properly photo-oxidation. Color changes are frequently associated not only with the polymer, but with impurities such as residual styrene monomer in polystyrene or traces of iron in polyesters or with sensitive additives such as plasticizers or dyestuffs. It is significant that this type of oxidation cannot be mitigated to any appreciable extent with conventional anti-oxidants. Indeed, it is often found that anti-oxidants which are excellent stabilizers in other media afford no relief whatsoever from this type of oxidation.

Thus, it is an object of this invention to provide a superior stabilizing material which inhibits the oxidative and deteriorative effects of ultra-violet light. A further object is to provide improved plastic containing such stabilizing material.

The above and other objects are accomplished by this invention, which consists of providing a composition of matter comprising a plastic and a stabilizing quantity of a compound represented by the formula:

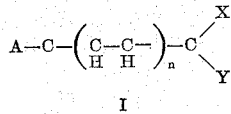

I wherein A is an aromatic group having an isolated benzene nucleus, said benzene nucleus being directly attached to the carbon directly linked to the group designated by Z; Z is selected from the group consisting of hydrogen, alkyl radicals containing from 1–12 carbon atoms, aryl radicals containing from 6–12 carbon atoms and aralkyl radicals containing from 7–12 carbon atoms; Y is selected from the group consisting of hydrogen, a cyano radical, a nitro radical, a difluoromethyl radical, a trifluoromethyl radical and a group having the formula:

—CON(R)$_2$
—COOR
—COR wherein R is selected from the group consisting of hydrogen, alkyl radicals containing from 1–12 carbon atoms and aralkyl radicals containing from 7–12 carbon atoms; X is selected from the group consisting of a cyano radical, a nitro radical, a difluoromethyl radical, a trifluoromethyl radical, and a group having the formula:

—CON(R)$_2$
—COOR
—COR and $n$ is an integer from 0–4 inclusive.

The aromatic groups which are represented by A in the above formula are groups containing an isolated benzene nucleus. That is, they are aromatic groups which are free of aliphatic unsaturation. The applicable aromatic groups have no aliphatic double bond in conjugated relationship to the ring. Thus, aralkyl and alkyl substituted aromatic groups are applicable to this invention. Likewise, hydroxy, polyhydroxy, alkoxy and aralkoxy substituted aromatic groups are applicable to this invention. Groups containing a combination of alkyl, hydroxy, alkoxy or aralkyl substituents are also applicable to this invention.

A preferred class of additive compounds are those represnted by the following formula:

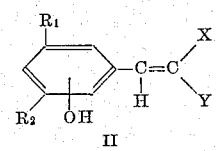

II wherein R$_1$ is an alkyl radical containing from 1–12 carbon atoms; R$_2$ is an alpha-branched alkyl radical containing from 3–12 carbon atoms; Y is selected from the group consisting of hydrogen, a cyano radical, a nitro radical and a group having the formula:

—CON(R)$_2$
—COOR
—COR wherein R is selected from the group consisting of hydrogen, alkyl radicals containing from 1–12 carbon atoms and aralkyl radicals containing from 7–12 carbon atoms; X is selected from the group consisting of a cyano radical, a nitro radical, and a group having the formula:

—CON(R)$_2$
—COOR
—COR wherein R is the same as above.

In a highly preferred class of the additive compounds of this invention, the hydroxyl group on the aromatic group shown in above Formula II is located in a position para to the substituted vinyl substituent. In other words, the hydroxyl radical is located in the position between the R$_1$ and R$_2$ substituent. Some examples of these aromatic substituents include 3-methyl-5-isopropyl-4-hydroxylphenyl, 3-ethyl-5-tert-butyl-4-hydroxyphenyl, 3-dodecyl-5-isopropyl-4-hydroxyphenyl, 3,5-diisopropyl-4-hydroxyphenyl, 3-methyl-5-isoamyl-4-hydroxyphenyl, 3,5-dicyclohexyl-4-hydroxyphenyl, 3,5-di(α-methylbenzyl)-4-hydroxyphenyl, 3-methyl-5-(α-methylbenzyl)-4-hydroxyphenyl, 3(α,α-dimethylbenzyl)-5-tert-butyl-4-hydroxyphenyl, and 3-sec-butyl-5-tert-dodecyl-4-hydroxyphenyl. The foregoing examples represent only the aromatic portion of the molecule, as designated by "A" in Formula I.

Thus, when the aromatic group represented by "A" in Formula I is replaced by one of the above preferred radicals, a highly preferred embodiment of the present invention is obtained which can be represented by the formula:

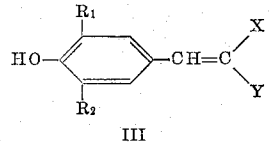

III wherein $R_1$ is an alkyl radical containing from 1–12 carbon atoms, and $R_2$ is an alpha-branched alkyl radical containing from 3–12 carbon atoms, and X and Y are the same as in Formula II.

In an especially preferred embodiment of this invention, X in the foregoing Formula III is represented by the nitrile radical —CN, and Y is an ester group. This embodiment can be represented by the following formula:

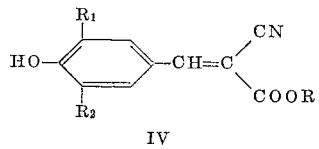

IV wherein R is an alkyl radical containing from 1–12 carbon atoms or an aralkyl radical containing from 7–12 carbon atoms, and $R_1$ and $R_2$ are the same as in Formula III. Examples of these highly preferred compounds include methyl-3,5-diisopropyl-4-hydroxy-α-cyanocinnamate, ethyl - 3 - methyl-5-tert-butyl-4-hydroxy-α-cyanocinnamate, n-propyl-3-methyl-5-(α-methylbenzyl)-4-hydroxy-α-cyanocinnamate, hexyl-3,5-di-tert-butyl-4-hydroxy-α-cyanocinnamate, octyl-3,5-dicyclohexyl-4-hydroxy-α-cyanocinnamate, decyl-3-methyl-5-sec-dodecyl-4-hydroxy-α-cyanocinnamate, dodecyl-3,5-di-sec-dodecyl-4-hydroxy-α-cyanocinnamate.

In the most preferred embodiment of this invention, $R_1$ and $R_2$ are tert-butyl radicals. These compounds include dodecyl-3,5-di-tert-butyl-4-hydroxy-α-cyanocinnamate, decyl-3,5-di-tert-butyl-4-hydroxy-α-cyanocinnamate, octyl-3,5-di-tert-butyl-4-hydroxy-α-cyanocinnamate, butyl-3,5-di-tert-butyl-4-hydroxy-α-cyanocinnamate, and especially ethyl-3,5-di-tert-butyl-4-hydroxy-α-cyanocinnamate.

The additive compounds of this invention can be prepared by reacting a compound having the formula:

with a compound having the formula: X—$CH_2$—Y, under basic conditions. The base to be used and the conditions of the reaction vary, depending on the type of constituents desired to be reacted. Thus, ethyl-3,5-di-tert-butyl-α-cyano-4-hydroxycinnamate can be prepared by the reaction of 3,5-di-tert-butyl-4-hydroxybenzaldehyde with ethyl cyano acetate in dioxane, made basic with piperidine. Likewise, o-(2-nitrovinyl)phenol may be prepared by the reaction of solicyaldehyde with nitromethane in ethanol, made basic with potassium hydroxide. In this reaction the temperature of the mixture is maintained below 0° C. during the reaction. The product is separated following a neutralization of the reaction mixture with dilute hydrochloride acid. Similarly N,N-di-n-dodecyl - 2 - difluoromethyl-11-[3-(p-n-pentylbenzyl)-2-n-hexyloxyphenyl] - 12-phenyl-2,4,6,8,10-dodecapentaenamide can be prepared from the reaction of 3-(p-n-pentylbenzyl) - 2-n-hexyloxyphenyl-α-phenylbenzaldehyde with N,N - di-n-dodecyl-2-di-fluoromethyl-2,4,6,8-undecapentaenamide in ethanol, made basic with piperidine. Also, 3-n - butyl - α - n-dodecylcarbonyl-6-ethyl-2-isopropyl-4-hydroxy-5-methylcinnamide can be prepared from the reaction of 3-n-butyl-6-ethyl-2-isopropyl-4-hydroxy-5-methylbenzaldehyde with 2-dodecylcarbonylethanamide in ethanol, made basic with piperidine.

In this invention the term plastic is used to represent any one of a group of materials which consist of, or contains as an essential ingredient, a thermosetting or thermoplastic substance of high molecular weight, and which, while solid in the finished state, at some stage in its manufacture is soft enough to be formed into various shapes usually through the application, singularly or together, of heat and pressure. Examples of such plastics are the phenolic resins; the aminos, such as urea-formaldehyde resins and melamine-formaldehyde resins; the unsaturated and saturated polyester resins, including the oil modified alkyd resins; the styrene homo-polymers and co-polymers, such as polystyrene and styrene-acrylonitrile co-polymer; the acrylic monomers and polymers; substituted acrylic and methacrylic acids, their salts, esters, and other derivatives, such as nitriles and amides; the cellulosics, such as cellulose acetate, cellulose acetate butyrate, cellulose nitrate, cellulose propionate, ethyl cellulose, nitro-cellulose, carboxymethyl cellulose, hydroxyethyl cellulose, and cellophane; linear and branched polyolefins, such as polyethylene and polypropylene; the polyureathanes; the vinyl homopolymers, and co-polymers, such as polyvinyl chloride, polyvinyl acetate, polyvinyl chloride acetate, polyvinyl acetals, polyvinyl alcohols, polyvinyl butyral, and polyvinyl formal, polyvinylidene chloride, polyvinylidene co-polymers, polyvinyl alkylethers, polyvinyl pyrrolidene, polyvinyl carbazole, polyvinyl naphthanate, polyvinyl benzoate, and polyvinyl fluoride; the polyamides; the condensation products of dibasic organic acids and diamines such as nylon; sulfur-vulcanized and non-vulcanized natural rubber, rubber homopolymers of conjugated dienes and rubbery co-polymers of a conjugated diene and a monoolefinic compound having the $CH_2$=C= group.

The above material also includes those plastics which are in combination with other material, for example with fillers such as flour, cotton, shredded or chopped cloth, chopped canvas, paper pulp forms, asbestos, powdered mica, calcium carbonate, carbon, graphite, quartz, diatomaceous silica, fibrous glass, barytes, calcium silicate, iron, barium sulfate, litharge and clay; plasticizers such as phthalates, phosphates, esters including adipates, azelates and sebacates, polymeric plasticizers including polyesters of adipic, azelaic, and sebacic acid with glycols terminated with long-chain fatty acids, epoxy, fatty acid esters, esters of glycols such as phthalyl glycolates, sulfonamides; secondary plasticizers including hydrocarbons, chlorinated hydrocarbons and nitrated hydrocarbons; polymerizable plasticizers; stabilizers such as inorganic acid derivatives including basic lead carbonate, tribasic-lead sulfate, dibasic-lead phosphite, sodium carbonate, di- and trisodium phosphate and the salts of polyphosphoric acid partial esters, organic acid salts including the metal salts of stearic, lauric, ricinoleic, capric, caproic, myristic, 2-ethylhexanoic, maleic, phthalic, naphthenic, alkylated benzoic and salicyclic acids, organometallics including dibutyltin dilaurate, dibutyltin maleate and their mixtures, dibutyltin monomethoxy, monomethylmaleate and the dialkyltin mercaptans, organic compounds including the epoxides, organic phosphites, polyols, nitrogen derivatives; antioxidants; colorants such as the dyes, the organic pigments and inorganic pigments; and reinforcing fibers.

The preferred concentration range of the additive compound in the plastic is from 0.001 to about 3 percent. This concentration range is preferred since it results in compositions of maximum stability at a minimum of cost.

The additive compounds of this invention can be incorporated into the plastic material by a variety of means. For example, a convenient method of addition to plasticized materials is to dissolve the absorber in the plasticizer. The absorber can also be added by dry blending with the resin powder or granules prior to processing. For example, with polyesters, the absorber can be added to the resin from a master batch solution of the absorber in the monomer, or they can be incorporated by stirring into the cut polyester resin system; in polystyrene a convenient procedure is to add these materials to the polystyrene beads. The mixture is then dry-tumbled and extruded. With cellulosics applicants have found that incorporating the absorber in the plasticizer is very convenient. In vinyl plastics the absorber may be added to a dry powder form of the rigid vinyl co-polymer. The mixture is then milled and calendered or extruded. In polyethylene the absorber can be added to the raw polymer at the same time as other ingredients. The resultant mixture is then subjected to extrusion or calendering. The absorber can also be added to dry polyethylene and mixed by milling. In plastics containing fillers of the various sorts, the absorber can be premixed with the filler before its incorporation.

A preferred embodiment of this invention consists of a plastic as defined above containing a stabilizing quantity of a compound of Formula I wherein $n$ is zero. These compositions are preferred because of the greater stability of the additive compound. Examples of the compounds of this embodiment include:

4-(3-difluoro-2-difluoromethyl-1-methyl-1-propenyl)-
  6-isopropyl-m-cresol;
2-tert-butyl-3,6-dihydroxy-5-isopropyl-4-methoxy-
  N,N-dimethyl-α-nitrocinnamide;
n-octyl 3-n-dodecyl-β-(p-ethylbenzyl)-4-(p-ethyl-
  benzyloxy)-5-n-octyl-α-cyanocinnamate;
1-ethoxy-3-(1-nitromethylene-n-propyl)benzene;
N,N-dibenzyl-α-cyano-β-n-dodecyl-2,3,4,5,6-
  pentahydroxycinnamide;
diethyl (2-ethoxy-3,4,5,6-tetrahydroxy-α-phenyl-
  benzylidene)malonate; and
β-(o-ethylphenyl)-3-hydroxy-5-isopropoxy-2,6-dimethyl-
  N,N-bis(p-n-pentylbenzyl)-4-(2-propenyl)-α-nitro-
  cinnamide.

Another preferred embodiment of this invention consists of a plastic as defined above containing a stabilizing quantity of a compound of Formula I wherein $n$ is zero and Z is hydrogen. These compositions are preferred because of the greater ultra-violet light absorbence capacity and greater stability of the additive compound. Examples of the compounds of this embodiment include:

3-n-butyl-α-n-dodecylcarbonyl-6-ethyl-2-isopropyl-
  4-hydroxy-5-methylcinnamide;
p-(2-nitrovinyl)phenol;
n-decyl α-difluoromethyl-2,4-di-n-dodecyl-3,6-
  dihydroxycinnamate;
o-(2-nitrovinyl)phenol;
ethyl α-cyanocinnamate;
1,3,4-tri-n-butyl-5-(2,2-dinitrovinyl)-2,6-dimethoxy-
  benzene;
ethyl α-cyano-4-hydroxycinnamate;
2,6-di-tert-butyl-3-(2,2-dicyanovinyl)hydroquinone;
ethyl α-cyano-2-hydroxycinnamate; and
3-(o-hydroxybenzylidene)-2,4-pentanedione.

A particularly preferred embodiment of this invention consists of a plastic as defined above containing a stabilizing quantity of a compound represented by the formula:

(II) 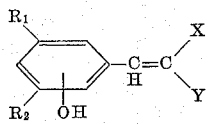

wherein $R_1$ is an alkyl radical containing from 1–12 carbon atoms; $R_2$ is an alpha-branched alkyl radical containing from 3–12 carbon atoms; Y is selected from the group consisting of hydrogen, a cyano radical, a nitro radical and a group having the formula:

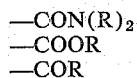

wherein R is selected from the group consisting of hydrogen, alkyl radicals containing from 1–12 carbon atoms and aralkyl radicals containing from 7–12 carbon atoms; X is selected from the group consisting of a cyano radical, a nitro radical, and a group having the formula:

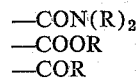

These compositions are preferred because of the high antioxidant effectiveness as well as high ultra-violet light absorbence capacity of the additive compound. Examples of the compounds of this embodiment include

[3-n-dodecyl-2-hydroxy-5-(1-n-propyl-n-nonyl)
  benzylidene]malonamide;
2,6-di-tert-butyl-4-(2-nitrovinyl)phenol;
2,6-diisopropyl-4-(2-cyanovinyl)phenol;
2,4-di-tert-butyl-6-(2-nitrovinyl)phenol;
6-tert-butyl-4-(2-nitrovinyl)-o-cresol;
[3-(1-ethyl-n-hexyl)-2-hydroxy-6-n-pentylbenzylidene]
  malonic acid;
2-tert-butyl-6-(2-nitrovinyl)-p-cresol;
6-isopropyl-4-(2,2-dicyanovinyl)-o-cresol;
(3,5-di-tert-butyl-4-hydroxybenzylidene)malono-
  nitrile; and
(3-tert-butyl-4-hydroxy-5-methylbenzylidene)malono-
  nitrile.

The most particularly preferred embodiment of this invention consists of a plastic as defined above containing a stabilizing quantity of a compound having Formula IV wherein R is an alkyl radical containing from 1–12 carbon atoms or an aralkyl radical containing from 7–12 carbon atoms, and $R_1$ and $R_2$ are the same as in Formula III. These compositions are particularly preferred because of the high antioxidant effectiveness, excellent ultra-violet light absorbent capacity and high stability of the additive compounds. Examples of the compounds of this embodiment include ethyl-3-methyl-5-sec-butyl-4-hydroxy-α-cyanocinnamate, dodecyl-3,5-di-tert-butyl-4-hydroxy-α-cyanocinnamate, decyl-3,5-di-tert-butyl-4-hydroxy-α-cyanocinnamate, octyl-3,5-di-tert-butyl-4-hydroxy-α-cyanocinnamate, and especially ethyl-3,5-di-tert-butyl-4-hydroxy-α-cyanocinnamate.

In the above description of our invention the compositions were described as plastic containing a stabilizing quantity of the additive compound. It is our intention not to limit our invention to any particular concentration range, inasmuch as the concentration of additive compound required for any particular application can be quite different from that required for another application. However, we have found that in most cases a concentration of up to about 5 percent of the additive compound in the plastic gives satisfactory results. A preferred range is from 0.001 to about 3 percent by weight of the additive compound in the plastic. We have found this preferred range to give excellent results in most embodiments of our invention.

The benefits derived from the practice of this invention are demonstrated by comparative, accelerated weathering tests of uninhibited polyethylene and polyethylene containing the additive compounds of this invention. These tests are a modification of ASTM D795–57T and are conducted as follows: The selected amount of additive compound is blended with the polyethylene by milling a weighed quantity of plastic pellets on a warm rollmill. The weighted quantity of additive compound is added to the mill after the polyethylene has been premilled for a short period of time. The plastic containing the additive compound is then compression molded between polished plates to form sheets. The specimens which are cut from the sheet are 4 inches in length and 1½ inches in width with a tapered end as shown in FIGURE 4, ASTM D795–57T. The specimens are fastened on a light-colored corrosion-resistant metal disc approximately 17 inches in diameter and 0.1 inch in thickness. The disc is mounted on a phonograph turntable operating at approximately 33 r.p.m. and is centered under a S-1 bulb (which consists of a combination tungsten filament-mercury arc enclosed in Corex D glass which absorbs most of the ultra-violet radiation below 2800 A. The resultant radiation comprises that range of the ultra-violet spectrum which has the most deteriorative effect upon the stability of plastic, namely, the 2800–4000 A. range). The specimens are arranged so that their bottom planes are 6 inches from the bottom of the bulb. The ambient temperature is maintained at 55 to 60° C. with a fan. The specimens are exposed throughout the test to ultra-violet radiation with the same side up during the duration of the test. At the end of the test, observations are made regarding surface changes (such as color, dulling and chalking) and deep-seated changes (such as checking, crazing, warping and discoloration). In tests of this nature polyethylene specimens containing 0.20 percent of ethyl - 3,5-di-tert-butyl-α-cyano - 4 - hydroxycinnamate show substantial stability toward the effects of ultra-violet light, whereas uninhibited polyethylene shows a high degree of discoloration, crazing, warping and chalking.

In other tests of this nature the compositions of this invention show outstanding superiority to other plastic material not containing an additive compound of this invention. For example, when polypropyelne containing .25 weight percent of ethyl-3,5-di-tert-butyl-α-cyano-4-hydroxycinnamate is subjected to the above test, the protected test specimen shows no physical change while an unprotected polypropylene specimen is greatly deteriorated and shows the effects of oxidation due to the absorption of ultra-violet light. Likewise, when a phenolic resin containing .50 weight percent of ethyl(α-cyano-4-hydroxy-3-tert-butyl-5-methyl)cinnamate is subjected to ultra-violet radiation, as in the above test, it remains unchanged after the test period whereas unprotected phenolic resins show the deteriorative and oxidative effects of the ultra-violet radiation.

The following examples further illustrate compositions which when subjected to the above test show no change in physical characteristics as compared to the corresponding unprotected plastic.

EXAMPLE I

Five weight percent of 3-(o-hydroxybenzylidene)-2,4-pentanedione is mixed with the dibutyl ester of phthalic acid. While cellulous acetate is stirred in a heated vessel and the di-butyl thalate ester is sprayed onto the powdered resin. The mixture is blended and poured into a mold cavity where it is extruded into a sheet. Specimens are cut and tested as described above.

EXAMPLE II

Two-hundredths weight percent of 3-n-butyl-α-n dodecylcarbonyl-6-ethyl-2-isopropyl-4-hydroxy - 5 - methylcinnamide is added to dry powdery polyvinyl acetate. The mixture is then milled and extruded into sheets. Specimens are cut and tested as described above.

EXAMPLE III

Polyester resin is cut finely and stirred in a heated vessel. 0.08 weight percent of n-octyl-3-dodecyl-β-(p-ethylbenzyl-4-(p-ethylbenzyoxy) - 5-n-octyl-α-cyanocinnamate is added and the mixture is heated, poured into a mold and extruded into a sheet. Specimens are cut and tested as described above.

EXAMPLE IV

One weight percent of ethyl(3,5-di-tert-butyl-α-cyano-4-hydroxy)cinnamate is added to polystyrene beads. The mixture is then dry-tumbled, poured into a mold and extruded into sheets. Specimens are cut and tested as described above.

EXAMPLE V

Sodium methacrylate is mixed with 0.001 weight percent of 6-tert-butyl-4-(2-nitrovinyl)-o-cresol, poured into a mold and extruded with heat and pressure into a sheet. Samples are cut and tested as described above.

EXAMPLE VI

Nitrocellulose is mixed with 0.35 weight percent of 2,6-di-tert-butyl-4-(2-nitrovinyl)phenol, poured into a mold and extruded under heat and pressure into a sheet. Specimens are cut and tested as described above.

EXAMPLE VII 3.0 weight percent of o-(2-nitrovinyl)phenol is mixed with dry powdered half-second butyrate, poured into mold and extruded with heat and pressure into a sheet. Specimens are cut and tested as described above.

In all of the above tests, the plastics containing an additive compound of this invention show very little or no change in physical structure and properties, while the corresponding unprotected plastics are very severely adversely affected by the ultra-violet radiation, showing crazing, cracking, and discoloration.

The following examples, in which all the parts are by weight, further illustrate the embodiments of this invention.

EXAMPLE VIII

To a master batch of high density polyethylene having a specific gravity of 0.965, a compression ratio of 2.0, a tensile strength of 5500 p.s.i., a compressive strength of 2400 p.s.i., a Shore D hardness of 70 and a heat distortion temperature, under 66 p.s.i., of 180° F. is added 5 percent of n-dodecyl-5-[3-n-dodecyl-2-(1-ethyl-n-pentyl)-6-isopropyl - 4 - methoxy - 5 - methylphenyl] - 2 - trifluoromethyl-2,4-undecadienoate to prepare a composition of outstanding stability toward the oxidative effects of ultra-violet light.

EXAMPLE IX

A linear polyethylene having a high degree of crystallinity, up to 93 percent, and less than one ethyl-branched chain per 100 carbon atoms, a density of about 0.96 gram per millimeter and which has about 1.5 double bonds per 100 carbon atoms, is treated with $50 \times 10^{-6}$ roentgens of β radiation. To the thus irradiated polymer is added 0.001 percent of ethyl(α-cyano-4-hydroxy-3,5-diisopropyl)cinnamate and the resulting product has better stability characteristics toward the destructive effects of ultra-violet light.

EXAMPLE X

Two parts of 2,6-diisopropyl-4-(2-trifluoromethyl-3,3,3-trifluoro-1-propenyl)phenol are added with milling to 100 parts of a low density polyethylene which has a specific gravity of 0.910, a compression ratio of 1.8, a tensile strength of 1000 p.s.i., a Shore D hardness of 41 and a heat distortion temperature, under 66 p.s.i., of 105° C. The resulting product is vastly improved in its stability toward the deteriorative effects of ultra-violet light.

EXAMPLE XI

To 10,000 parts of a medium density polyethylene having a specific gravity of 0.933, a compression ratio of 2.0, a tensile strength of 1800 p.s.i., a Shore D hardness of 60 and a heat distortion temperature, under 66 p.s.i., of 135° F., is added 10 parts of p-(2-nitrovinyl)phenol to prepare a composition of outstanding stability toward the oxidative and deteriorative effects of ultra-violet light.

EXAMPLE XII

To a batch of polypropylene having a specific gravity of 0.90, a tensile strength of 4300 p.s.i., a compressive strength of 8500 p.s.i., a Rockwell hardness of 85 and a heat distortion temperature of 210° F., under 66 p.s.i., is added 3.0 percent of N,N-dibenzyl-α-cyano-β-n-dodecyl-2,3,4,5,6-pentahydroxycinnamide to prepare a composition of exceptional stability toward the deteriorative effects of ultra-violet light.

EXAMPLE XIII

To a polypropylene having a specific gravity of 0.91, a heat distortion temperature of 230° F., under 66 p.s.i., a Rockwell hardness of 110, a tensile strength of 5700 p.s.i., and a compressive strength of 10,000 p.s.i., is added .5 percent of ethyl 3-methyl-5-isopropyl-α-cyano-4-hydroxycinnamate and the resulting product has excellent stability toward the deteriorative effects of ultra-violet light.

EXAMPLE XIV

To 5000 parts of an acetal plastic having a specific gravity of 1.4, a tensile strength of 10,000 p.s.i., a compressive strength of 18,000 p.s.i., a Rockwell hardness of 118 and a heat distortion temperature, under 66 p.s.i., of 338° F., is added 10 parts of ethyl ($\alpha$-cyano-2-hydroxy-3-isopropyl-5-methyl)cinnamate to yield a composition of outstanding stability toward the effects of ultra-violet light.

EXAMPLE XV

To a batch of chlorinated polyether having a density of 1.4, a flexural strength of 5000 p.s.i., a Rockwell hardness of 100, a tensile strength of 6000 p.s.i., and a heat distortion temperatrue, under 66 p.s.i., of 300° F. is added 3 percent of benzylidenemalononitrile to prepare a composition of extreme stability toward the effects of ultra-violet light.

EXAMPLE XVI 1.5 parts of methyl $\alpha$-acetal-5-benzyl-2-n-dodecyloxy-3-n-hexylcinnamate are added to 100 parts of a nylon molding compound containing 30 percent of a glass fiber filler, which composition has a density of 1.30, a heat distortion temperature of 490° F. under 264 p.s.i., a compressive strength of 15,000 p.s.i., and a tensile strength of 14,000 p.s.i. The resulting product is highly stable toward the oxidative effects of ultra-violet light.

EXAMPLE XVII

To 20,000 parts of a polytetrafluoroethylene molding compound having a density of 2.22, a tensile strength of 4500 p.s.i., a compressive strength of 1700 p.s.i., a Shore D hardness of 65 and a heat distortion temperature, under 66 p.s.i., of 250° F. is added 10 parts of (3,5-di-tert-butyl-4-hydroxybenzylidene)malononitrile to prepare a composition of excellent stability toward ultra-violet light.

EXAMPLE XVIII

To each of the compounds in Table I is added 2 percent of n-propyl-$\beta$-n-dodecyl-3-methyl-5-(1-methyl-n-hexyl)-$\alpha$-nitrocinnamate.

The resulting products are vastly improved in their stability toward the deteriorative effects of ultra-violet light.

EXAMPLE XIX

To 5,000 parts of polychlorotrifluoroethylene having a density of 2.1, a compression of 2.0, a tensile strength of 5700 p.s.i., a compressive strength of 32,000 p.s.i., and a Rockwell hardness of 110 is added 10 parts of (3-tert-butyl-4-hydroxy-5-methylbenzylidene)malononitrile to yield a composition of excellent stability toward ultra-violet light.

EXAMPLE XX

To each of the compounds in Table II is added 1.3 percent of ethyl 3,5-di-tert-butyl-$\alpha$-cyano-4-methoxy-2-(p-n-pentylbenzyloxy)cinnamate.

Table II

| | Specific Gravity | Compression Ratio | Tensile Strength, p.s.i. | Compressive Strength, p.s.i. | Shore D Hardness | Heat Distortion Temperature, ° F. |
|---|---|---|---|---|---|---|
| Ethyl cellulose molding compound | 1.17 | 2.4 | 8,000 | 35,000 | 115 | 190 |
| Cellulose acetate molding compound | 1.32 | | 8,000 | 25,000 | 120 | 160 |
| Cellulose propionate molding compound | 1.24 | 2.4 | 7,300 | 22,000 | 120 | 250 |
| Cellulose acetate butyrate molding compound | 1.22 | | 6,900 | | 115 | 200 |
| Cellulose nitrate molding compound | 1.40 | | 8,000 | 22,000 | 115 | 160 |

The resulting products are vastly improved in their stability toward the deteriorative effects of ultra-violet light.

EXAMPLE XXI

To a batch of methyl methacrylate molding compound having a density of 1.20, a compression ratio of 2.0, a tensile strength of 11,000 p.s.i., a compressive strength of 18,000 p.s.i., and a heat distortion tempearture of 195° F. is added 1.0 percent of 2,4-di-tert-butyl-6-(2-nitrovinyl) phenol to give a composition of extremely high stability toward the degradative effects of ultra-violet light.

EXAMPLE XXII 0.5 parts of n-decyl $\alpha$-difluoromethyl-2,4-di-n-dodecyl-3,6-dihydroxycinnamate are added with milling to 100 parts of polystyrene which has a density of 1.04, a tensile strength of 5,000 p.s.i., a compressive strength of 11,500, and a heat distortion temperature of 150° F. The resulting product is greatly improved in its stability toward the effects of ultra-violet light.

EXAMPLE XXIII

To 10,000 parts of unfilled melamine-formaldehyde molding compound having a specific gravity of 1.48, a compression ratio of 2.0, a compressive strength of 40,000

Table I

| | Specific Gravity | Compression Ratio | Tensile Strength, p.s.i. | Compressive Strength, p.s.i. | Shore D Hardness | Heat Distortion Temperature, ° F. |
|---|---|---|---|---|---|---|
| Vinyl acetate molding compound | 1.18 | | 5,000 | | | 100 |
| Vinyl alcohol molding compound | 1.21 | | 1,000 | | 10 | |
| Vinyl butyral molding compound | 1.07 | | 4,000 | | | 115 |
| Vinyl chloride acetate molding compound | 1.35 | 2.0 | 5,000 | 8,000 | 70 | 130 |
| Vinylidene chloride molding compound | 1.65 | 2.0 | 3,000 | 2,000 | | 130 |
| Vinyl chloride molding compound | 1.45 | 2.4 | 9,000 | 13,000 | 90 | 165 |
| Vinyl formal molding compound | 1.2 | | 10,000 | | | 150 | p.s.i., and a heat distortion temperature of 298° F. is added 4.0 parts of ethyl(3,5-di-tert-butyl-α-cyano-2-hydroxy)cinnamate to give a composition of excellent stability toward the effects of ultra-violet light.

EXAMPLE XXIV

To a batch of mica-filled phenol-formaldehyde molding compound having a specific gravity of 1.65, a compression ratio of 2.1, a tensile strength of 5,000 p.s.i., a compressive strength of 15,000 p.s.i., and a heat distortion temperature of 230° F. is added 0.75 percent of N,N-di - n-dodecyl-2-fluoromethyl-11-[3-(p-n-pentylbenzyl)-2-n - hexyloxypheynl]-12-phenyl-2,4,6,8,10-dodecapentaenamide to prepare a composition of outstanding stability toward the degradative effects of ultra-violet light.

EXAMPLE XXV

To 100 parts of filled and vulcanized polyacrylic ester molding compound having a specific gravity of 1.5, a Shore D hardness of 90, and a tensile strength of 2,000 p.s.i. is added .02 part of [3-(1-ethyl-n-hexyl)-2-hydroxy-6-n-pentylbenzylidene]malonic acid to give a composition which is highly stable toward the oxidative effects of ultra-violet light.

EXAMPLE XXVI

To an asbestos-filled polyester molding compound which has a specific gravity of 1.65, a compression ratio of 2.5, a tensile strength of 7,000, a compressive strength of 22,500 p.s.i., and a heat distortion temperature of 315° F. is added 0.8 percent of ethyl α-cyanocinnamate to give a composition which has outstanding stability toward the effects of ultra-violet light.

EXAMPLE XXVII

To 1,000 parts of alpha-cellulose filled urea-formaldehyde molding compound which has a specific gravity of 1.47, a compression ratio of 2.2, a tensile strength of 6,000 p.s.i., a compressive strength of 25,000 p.s.i., and a heat distortion temperature of 260° F. is added 15 parts of ethyl (3-tert-butyl-α-cyano-2-hydroxy-5-methyl)cinnamate. The resulting composition is highly stable toward the degradative and oxidative effects of ultra-violet light.

EXAMPLE XXVIII

To a batch of epoxy molding compound having specific gravity of 1.88, a tensile strength of 10,000 p.s.i., a compressive strength of 13,000, and a heat distortion temperature of 290° F. is added 0.03 percent of 6-isopropyl-4-(2,2-dicyanovinyl)-o-cresol to give a composition which has excellent stability toward the effects of ultra-violet light.

EXAMPLE XXIX 0.3 parts of 1,3,4-tri-n-butyl-5-(2,2-dinitrovinyl)-2,6-dimethoxybenzene are added to 100 parts of a phenolic case resin containing an asbestos filler and having a specific gravity of 1.70, a tensile strength of 6,000 p.s.i., a compressive strength of 12,500 p.s.i., and a Rockwell hardness of 110. The resulting product is vastly improved in its stability toward the oxidative and degradative effects of ultra-violet light.

EXAMPLE XXX

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of ethyl α-cyano-4-hydroxycinnamate. This batch is then cured for 60 minutes at 45 p.s.i. of steam pressure. The resulting composition is extremely stable toward the oxidative and deteriorative effects of ultra-violet light.

EXAMPLE XXXI

Natural rubber stock is compounded according to the following formula:

| | Parts by weight |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2,6 - di - tert - butyl - 3 - (2,2 - dicyanovinyl)hydroquinone | 1 |
| Benzothiazyl disulfide | 0.4 |
| Amine activator | 0.5 |

This stock is then vulcanized for 60 minutes at 280° F. The resulting composition is extremely stable toward the oxidative and deteriorative effects of ultra-violet light.

EXAMPLE XXXII

A butadiene-acrylonitrile copolymer is produced from butadiene-1,3 and 32 percent of acrylonitrile. Two percent (based on the dry weight of the copolymer) of ethyl α-cyano-2-hydroxycinnamate is added as an emulsion in sodium oleate solution to the latex obtained from emulsion copolymerization of the monomers. The latex is coagulated with a pure grade of aluminum sulfate and the coagulum, after washing, is dried for 20 hours at 70° C. The resulting composition is extremely stable toward the oxidative and deteriorative effects of ultra-violet light.

EXAMPLE XXXIII

A polyester resin is cut finely and stirred in a heated vessel. 2.0 weight percent of ethyl 3,5-di-tert-butyl-α-cyano-4-hydroxycinnamate is added to the mixture which stirred and incorporated as an extender in fiber glass. This fiber glass is then formed into an external decorative paneling. The resultant paneling keeps its finish and luster, being extremely stable toward the oxidative and deteriorative effects of ultra-violet light.

While our invention is directed to plastics stabilized against the oxidative and deteriorative effects of ultra-violet light, the additive compounds of this invention are also useful as ultra-violet light absorbers in other materials, such as textiles, fuels, antiknock fluid mixes, paints, pigments, sun-tan lotions, foods, dyes, photographic material, wood, paper, fibrous materials, lubricants, functional fluids and other materials subject to change, oxidation or deterioration by ultra-violet light. Such materials can be protected by either admixing the additive compound directly with them or by placing a transparent carrier containing the additive compounds of this invention between the material to be protected and the source of light.

We claim:
Polypropylene containing a stabilizing quantity of ethyl 3,5-di-tert-butyl-4-hydroxy-α-cyanocinnamate.

References Cited by the Examiner

UNITED STATES PATENTS

| 3,052,636 | 9/1962 | Strobel et al. | 260—45.9 |
| 3,085,003 | 4/1963 | Morris | 260—45.95 |
| 3,196,128 | 7/1965 | Tazewell et al. | 260—45.85 |

FOREIGN PATENTS

| 1,087,902 | 8/1960 | Germany. | |

LEON J. BERCOVITZ, Primary Examiner.

DONALD E. CZAJA, Examiner.

G. W. RAUCHFUSS, Assistant Examiner.

UNITED STATES PATENT OFFICE
CERTIFICATE OF CORRECTION

Patent No. 3,280,069                                             October 18, 1966

Gordon G. Knapp et al.

It is hereby certified that error appears in the above numbered patent requiring correction and that the said Letters Patent should read as corrected below.

Column 1, lines 48 to 54, the formula should appear as shown below instead of as in the patent:

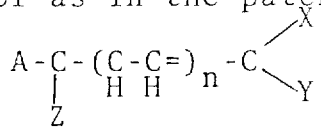

Signed and sealed this 12th day of September 1967.

(SEAL)
Attest:

ERNEST W. SWIDER                                             EDWARD J. BRENNER
Attesting Officer                                                    Commissioner of Patents